United States Patent [19]
Busam

[11] 3,855,935
[45] Dec. 24, 1974

[54] SELF ADJUSTING TRACK EXTENSION

[75] Inventor: Donald H. Busam, Hometown, Ill.

[73] Assignee: Interlake Inc., Chicago, Ill.

[22] Filed: Jan. 12, 1973

[21] Appl. No.: 323,266

Related U.S. Application Data

[62] Division of Ser. No. 213,981, Dec. 30, 1971, Pat. No. 3,732,992.

[52] U.S. Cl. .................. 104/48, 14/71, 105/366 R, 105/458
[51] Int. Cl. ......................... B60s 13/02, B61j 1/10
[58] Field of Search ....... 104/48; 105/366 R, 368 B, 105/458; 214/15, 85; 14/71, 72

[56] References Cited
UNITED STATES PATENTS

| | | | |
|---|---|---|---|
| 1,556,294 | 10/1925 | Meehan | 104/48 |
| 2,512,798 | 6/1950 | Hodges | 104/48 |
| 2,817,300 | 12/1957 | Shutt | 104/48 |
| 3,630,439 | 12/1971 | Cook | 14/71 |

Primary Examiner—Drayton E. Hoffman
Attorney, Agent, or Firm—Molinare, Allegretti, Newitt & Witcoff

[57] ABSTRACT

In a storage and retrieval system of the type having a plurality of aisles in which an article handling load carrier operates and a transfer car for transferring the load carrier between the aisles for operation in several of the aisles, track extensions are pivotally mounted to the transfer vehicle and a plurality of camming and support surfaces are positioned adjacent the rails at the ends of the aisles. A camming surface is also positioned on the end of the track extensions opposite their pivotal attachment to the transfer vehicle and, as the transfer vehicle is moved between the respective aisles, the camming surfaces move into alignment with each other to position the supporting surfaces of the adjustable track extensions in continuous and substantially coplanar relationship with the rails on the transfer vehicle and in the individual aisles.

2 Claims, 4 Drawing Figures

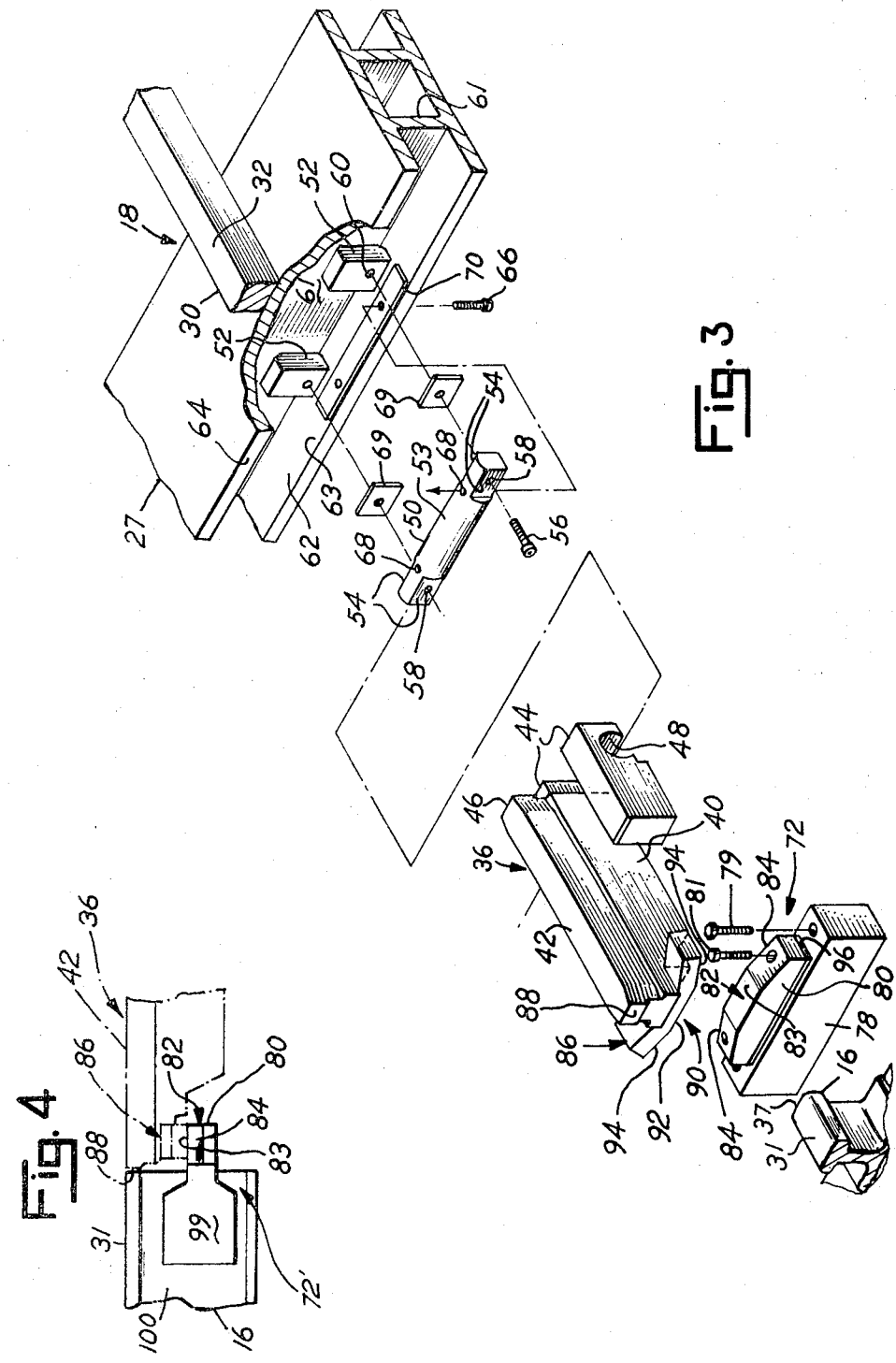

SELF ADJUSTING TRACK EXTENSION

This is a division of application Ser. No. 213,981, filed Dec. 30, 1971, now U.S. Pat. No. 3,732,992.

BACKGROUND AND SUMMARY OF THE INVENTION

This invention relates to a self adjusting track extension and, more particularly, to a self adjusting track extension in an article storage and retrieval system which includes an article handling vehicle or load carrier and a transfer vehicle for transferring the load carrier between the aisles of the system.

In mechanized storage and retrieval systems, it is frequently advantageous to transfer the article handling load carrier of the system between the various aisles of the storage frames in which the articles are stored in and retrieved from. Such transfer between aisles minimizes the cost of such systems, the load carriers employed in such systems frequently being large and expensive components of the system. In order to effect transfer of the load carrier between aisles, various transfer vehicle constructions and arrangements have been employed in the past in which a transfer vehicle is movable transversely of the aisles and which is adapted to supportably receive the load carrier thereon during the transfer operation. Due to the size of the load carriers and transfer vehicles of such systems, these vehicles are frequently designed to run upon rails, the transfer vehicle upon rails which extend transversely of the ends of the aisles, the load carrier upon rails which extend longitudinally in the aisles and also upon rails upon the support bed of the transfer vehicle which are alignable with the aisle rails. The transfer vehicle rails enable movement and positioning of the load carrier upon the transfer vehicle bed from the aisles for transfer of the load carrier.

In order to effect smooth movement of the load carrier, both onto and off of the transfer vehicle, the aisle rails, as well as the transfer vehicle bed rails, must be capable of accurate alignment with each other, so that when the transfer vehicle is positioned adjacent the aisle from which the load carrier is to be received from or to be discharged to, the vehicle supporting surfaces of these respective rails are accurately aligned in elevation with the corresponding surfaces of the rails in the aisles. Such elevational alignment in the prior systems has been time consuming and expensive, both in the establishment and setting of alignment tolerances during the initial installation of the system, as well as in the subsequent maintenance of these alignment tolerances. This is particularly the case where the storage and retrieval system is large and extensive in size. To achieve acceptable alignment, not only must the transfer vehicle bed rails be capable of accurate elevational alignment with respect to each and every given one of the rails in the aisles in which it is intended to operate the load carrier, but where the system includes more than one transfer vehicle, the bed rails of each vehicle must be both initially aligned and subsequently periodically checked and realigned with each of these aisle rails. In addition, after the passage of time, differential floor settling likely will occur, requiring frequent realignment to maintain the alignment tolerance relationships of the original installation, whether one or several transfer cars are employed in the system.

When practicing the principles of the present invention, accurate elevational alignment of the transfer vehicle bed rails and the aisle rails may be readily, easily, inexpensively and automatically realized in both large and small systems and in which there are a few or many aisles in which the load carrier of the system is to be operated. When practicing the principles of the present invention, not only is initial alignment of these rails simplified, but the adverse effects on such alignment due to differential floor settling over a period of time are minimized. In the present invention, a self adjusting supporting extension is contemplated which, when the transfer vehicle is positioned adjacent a desired aisle, will automatically align in continuous and substantially coplanar relationship its supporting surface with the supporting surfaces of the transfer vehicle and the aisles of the system.

In a principal aspect of the present invention, a self adjusting member is provided for supporting a first vehicle during transfer of the vehicle to and from a second vehicle. The self adjusting member comprises an elongate member having a supporting surface thereon which extends the length of the member and pivotal mounting means adjacent one end of the member mounts the member for pivotal movement. Cam means on the member, spaced from the pivotal mounting means, is constructed and arranged to cam the supporting surface of the elongate member about its pivot axis.

In another principal aspect of the invention, a self adjusting transfer arrangement for supportably transferring a first vehicle between a second vehicle and a given surface includes elongate means having a supporting surface thereon which is extendible between a support surface of the second vehicle and the given surface when the latter surfaces are positioned adjacent each other. Pivotal mounting means adjacent one end of the elongate means mounts the elongate means for pivoting about a pivot axis which is substantially parallel to the direction of movement of the second vehicle and cam means, spaced from the pivot axis, urges the supporting surface of the elongate means into continuous relationship with the support surface of the second vehicle and the given surface when the second vehicle is positioned adjacent the given surface.

In another principal aspect of the invention, an article storage and retrieval system includes a plurality of storage frames separated by a plurality of aisles, and a transfer vehicle which is movable across an end of the aisles for transferring a load carrier which is normally operable in the aisles between several of the aisles for operation. In this system, the improvement includes self adjusting means for supporting the load carrier during movement onto and off of the transfer vehicle. The self adjusting means includes elongate means having a supporting surface thereon which extends between the aisle surfaces and the support surfaces of the transfer vehicle and pivotal mounting means adjacent one end of the elongate means for pivotally mounting the latter about a pivot axis which is substantially parallel to the direction of movement of the transfer vehicle between the ends of the aisles. Cam means is associated with the elongate means and are spaced from the pivotal mounting means toward the other end of the elongate means for urging a supporting surface of the elongate means into continuous relationship with the load carrier supporting surfaces of the aisles and the transfer vehicle when the transfer vehicle is positioned adjacent to and in alignment with the ends of the aisles.

BRIEF DESCRIPTION OF THE DRAWINGS

In the course of this description, reference will frequently be made to the attached drawings in which:

FIG. 3 is a further enlarged exploded view of the preferred embodiment of self adjusting track extension of the present invention; and FIG. 4 is a partial side elevation view of another embodiment of self adjusting track extension constructed in accordance with the principles of the invention.

DESCRIPTION OF THE PREFERRED EMBODIMENTS

In the preferred embodiments of the present invention, a self adjusting track extension facilitates the movement of a first vehicle onto and off of the supporting bed of a second vehicle. Such vehicles, may be, for example, the vehicles in an article storage and retrieval system in which the first vehicle comprises a load carrier which is movable longitudinally in aisles between a plurality of storage frames in which the articles are to be stored in and retrieved from, and the second vehicle comprises a transfer vehicle or car which is movable transversely of the ends of the aisles and upon which the load carrier may be supportably received and discharged from, such that the load carrier may be moved for operation from one of the aisles to another of the several aisles in the system.

Figure 1:
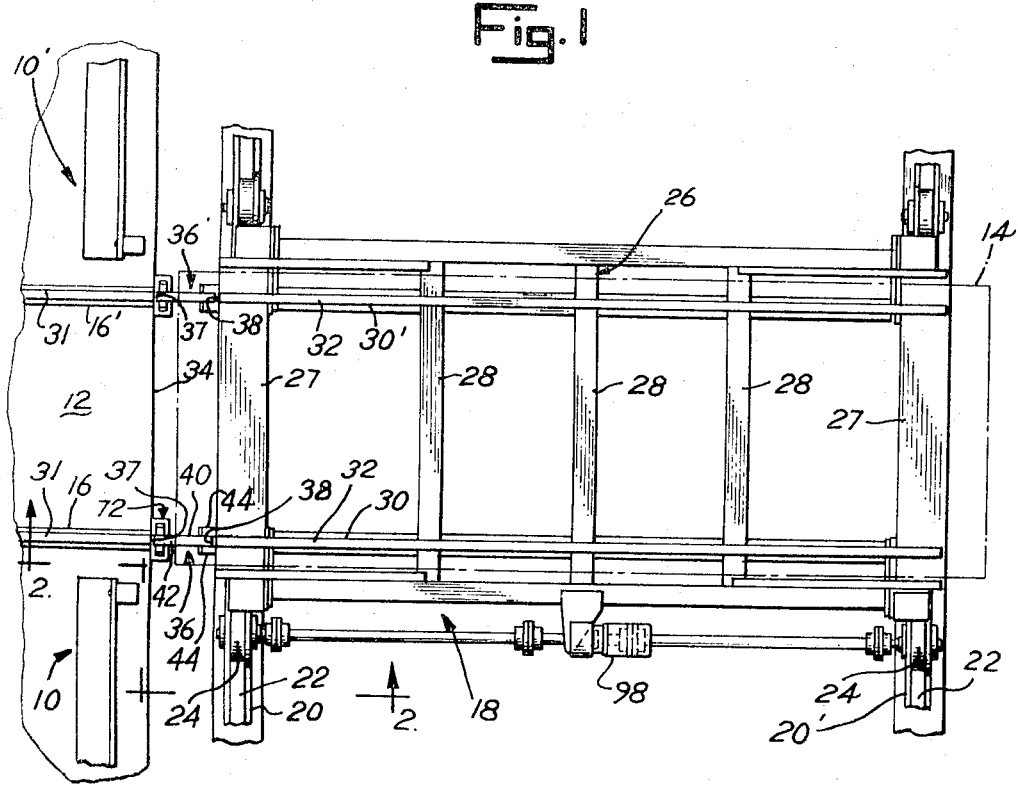
FIG. 1 is a plan view of a part of an article storage and retrieval system of the type employing a load carrier and transfer vehicle and which includes a preferred embodiment of self adjusting track extension incorporating the principles of the present invention.

Referring particularly to FIG. 1, a simplified version of such storage and retrieval system is shown which includes a plurality of storage frames 10 and 10' which are spaced from each other by an aisle 12. A load carrier 14, shown in dot and dash outline only in FIG. 1, is supported and movable upon one or more rails 16 and 16' which extend longitudinally in the aisle 12. Thus, the load carrier 14 is movable upon wheels on rails 16 and 16' in the aisle for the storage and retrieval of articles in selected ones of the storage frames 10. The load carrier 14, which may be quite large in size and quite expensive, is preferably transferable for operation between aisle 12 and other given aisles (not shown) which are parallel to aisle 12 in the storage system in order to minimize the overall expense of the installation by increasing the versatility and range of operation of a given load carrier.

In order to effect the transfer of the load carrier 14, a transfer vehicle or car 18 is provided which is movable on two or more rails 20 and 20' which extend transversely of the ends of the respective aisles 16. The upper surfaces of each of the rails 20 and 20' define support surfaces 22 which supportably receive the wheels 24 of the transfer vehicle thereon. Thus, the transfer vehicle 18 may be selectively moved into alignment with a selected one of the aisles 12 in order to receive or discharge the load carrier 14 from or to the rails 16 and 16' of the respective aisles. Since the load carrier 14 is to be supportably positioned upon the support bed 26 of the transfer vehicle 18 during transfer between the aisles, the support bed 26 of the transfer vehicle preferably includes a plurality of rigid support beams 27 and 28 upon which spaced supporting rails 30 and 30' are supported. These rails extend across the transfer vehicle in a direction parallel to and alignable with the aisle rails 16 and 16', respectively, to receive the wheels of the load carrier 14 thereon, the upper support surfaces 31 of the aisle rails 16 being as close to coplanar as is possible with the upper support surfaces 32 of the bed rails 30. The storage and retrieval system thus far described is conventional and will not be described in further detail, since the specific constructional details of the transfer vehicle, the storage frames and the load carrier form no part of the present invention, except as hereafter described, a wide variety of such components being readily available and which may be selectively chosen by one of ordinary skill in the art.

An important feature of the present invention resides in the self adjusting supporting member or track extension which automatically insures the continuity of alignment of the surfaces 31 and 32 of the aisle rails 16 and 16' and the support bed rails 30 and 30' which, in turn, enables smooth and rapid movement of the load carrier between the aisles and the transfer vehicle when the vehicle is to be transferred for operation between aisles. In the present invention, the transfer vehicle bed 26, and specifically the beam 27 adjacent the ends of the aisles, is spaced somewhat from the aisle ends 34 of the respective aisles 12. A pair of track extensions 36 and 36' span this distance between the spaced ends 37 and 38 of rails 16 and 16' and 30 and 30', respectively. Since the track extensions 36 and 36' are substantially identical in construction, extension 36 will be described in detail only.

The track extension 36 comprises an elongate substantially rigid member 40 which extends between the end 37 of the aisle rail 16 and the end 38 of the transfer car rail 30. Member 40 includes an upward facing support surface 42 which, as hereafter will be described, is automatically positioned to extend between the surfaces 31 and 32 of the aisle and the transfer car rails, respectively, and in continuous and substantial coplanar relationship with these respective surfaces. A pair of rigid plates 44 are firmly affixed, such as by welding, to the sides and at one end 46 of the member 40. These plates 44 form a part of a pivotal mounting structure and project beyond the end 46 of the member at which point each of the plates includes a substantially circular apertured cut out 48 for receipt of a hinge pin 50.

Firmly affixed to the side beam 27 of the transfer vehicle adjacent the ends of the aisles and storage frames, are a pair of spaced rigid mounting blocks 52. The hinge pin 50 comprises a rigid, substantially cylindrical shaft 53 having a pair of flattened ends 54 for preventing rotation of the shaft in the final assembly. The diameter of the cylindrical portion 53 is substantially equal to the diameter of the circular cut outs 48 and the pin is slipped through the cut outs as shown in FIG. 3. After mounting the pin in the cut outs, the pin with its now pivotally mounted track extension 36, is firmly fixed to the side beam 27 of the transfer vehicle, for example by way of bolts 56 which extend through apertures 58 in flattened ends 54 of the shaft, through apertures 60 in the mounting blocks 52, and into the web 61 of the I-beam which defines support bed beam 27 adjacent the ends of the aisles, thus mounting the pin 50 and blocks 52 in the open channel 62 which faces the aisles and which is defined between the beam flanges 63 and 64. Preferably bolts 66 also extend upward through apertures 68 in the pin and apertures in the flange 63 of beam 27 to further lock the pin 50 against rotation. In addition, suitable apertured shim packs, such as packs 69 and 70 may be provided to adjust the pivot axis of the track extension either horizontally or vertically and to insure adequate pivotal freedom and alignment of the surface 42 adjacent end 46 of the extension 36 with surface 32 of rail 30, respectively.

Figure 2:
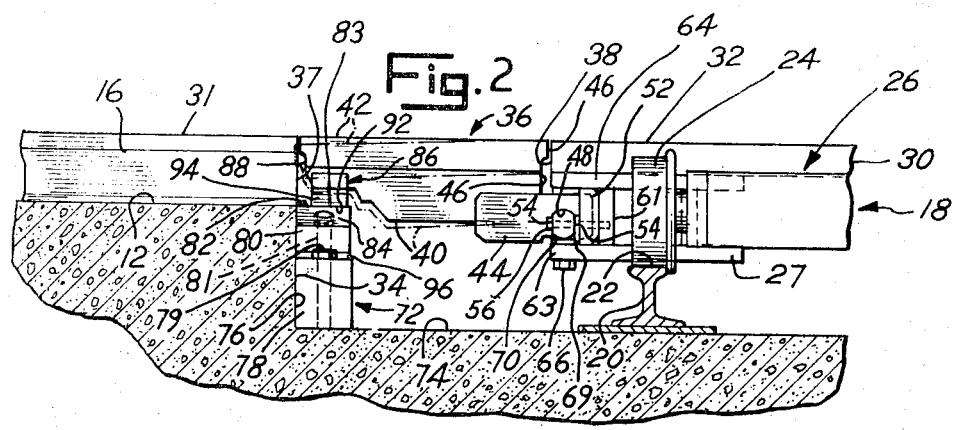
FIG. 2 is a partial, enlarged cross sectioned side elevation view of the system taken along line 2—2 of FIG. 1 and showing, in further detail, a preferred embodiment of self adjusting track extension of the present invention.

A support assembly 72 is rigidly fixed to the floor 74 of the installation adjacent the ends of the aisle rails 16 and the step 76 in the floor, as shown in FIG. 2. This support assembly 72 comprises a mounting block 78, which may be bolted to the floor with bolts 79, and a cam block 80, which may be bolted by bolts 81 onto member 78. Cam block 80 includes a convex upward facing camming and supporting surface 82, a portion 83 of which is at maximum elevation above the floor 74 and having a pair of inclined surfaces 84 extending downward therefrom in the direction of transverse movement of the transfer vehicle between the aisles.

A complementary camming member 86 is firmly affixed, as by welding, to the elongate member 40 in spaced relationship to the pivot axis provided by pin 50 and preferably at the other end 88 of the elongate member opposite the pivot axis. This camming member 86 also includes a convex curved camming surface 90 which faces downward toward the camming surface 82 of the cam block 80. Surface 90 includes a portion 92 of minimum elevation above the floor 74 and a pair of upwardly inclined surfaces 94 which extend upward from each side of the latter portion in the direction of movement of the transfer vehicle 18.

During movement of the transfer vehicle it will be seen that the portions 83 and 92 of the curved surfaces 82 and 90, respectively, will become substantially vertically aligned with each other and contact each other such that the surface 83 of member 80 will supportably position the surface 42 of the track extension 36 with the surface 31 of the aisle rail 16 in continuous relationship with each other. To insure accurate alignment continuity of surface 42 with each of the individual aisle rail surfaces in the various aisles, each of the respective cam blocks 80 at the ends of the aisle rails are preferably suitably shimmed, as by shim packs 96, such that the elevational distance between the surfaces 83 of the various cam blocks 80 and the surfaces 31 of their aisle rails 16 is substantially equal to the distance between the surfaces 92 and 42 of the track extensions. Thus, even though the elevation of floor 74 may vary between the aisles or the floor upon which the transfer vehicle may settle subsequent to installation, surfaces 31 and 42 will always be accurately aligned in continuous relationship with each other.

After considering the above description of the preferred embodiment of the present invention, its operation should be evident. However, for purposes of clarity a brief description of the operation of the invention follows.

It will be first assumed that the load carrier 14 is presently positioned in one of the aisles (not shown) and it is desired to transfer the load carrier to another aisle 16 for operation. The load carrier 14, preferably under its own power, will be driven toward the end of the aisle in which it is presently located and thence out of the aisle and onto the support bed 26 of the transfer vehicle 18 to the position as shown in the dot and dash lines in FIG. 1. This transition between the aisle and transfer vehicle is smooth, since the wheels of the load carrier, as they leave the ends 37 of the aisle rails 16 and 16', will be supported upon the surfaces 42 of the elongate track extensions 36 which have been accurately positioned in continuous substantially coplanar alignment and in transverse alignment with the aisle rail before the load carrier was enroute to the transfer vehicle.

Once the load carrier 14 has been positioned upon the transfer vehicle as shown in FIG. 1, the transfer vehicle will be driven transversely of the aisles by suitable drive means, such as the motor 98 shown in FIG. 1, toward aisle 16 in which it is desired to operate the load carrier, the track extensions 36 and 36' being carried along with the transfer vehicle, since they are mounted thereto. As the transfer vehicle approaches the aisle 16 in which it is desired to operate the load carrier, the left end 88 of the track extensions, as viewed in FIG. 2, will approach the camming and support surfaces 82 of the cam blocks 80 adjacent the ends 37 of the aisle rails and the convex camming surface 90 of the camming member 86 will contact the convex camming surface 82. Further movement of the transfer vehicle into alignment with the aisle 16, will cause the elongate members 40 to pivot about the pivot axis provided by pin 50, such that the support surface 42 of the elongate members will be cammed by the curved surfaces 82 and 90 from the position shown in the dot and dash lines in FIG. 2 upward to the solid position shown in FIG. 2, wherein surfaces 31, 42 and 32 are all in continuous and substantial coplanar relationship with each other. When the elongate members 36 and the aisle rails 16 have been accurately aligned with each other in both the horizontal and vertical, the transfer vehicle will be stopped and the load carrier will be operated, preferably under its own power, so as to move off of the transfer vehicle and onto the aisle rails 16 of the aisle 12 in which it is to operate. During discharge of the load carrier across the spanning track extensions 36 and 36', the elongate members will be firmly supported upon their hinge pins 50 at their one end 48 and at their other end by the mounting block 78 and cam block 80, since surface 92 will be vertically aligned with and rest upon surface 83 of the cam block, having been cammed there by the coaction of the inclined surfaces 84 and 94.

Referring to FIG. 4, another embodiment of support assembly 72' is shown in which the cam block 80 is mounted to the end of the aisle rail 16, rather than upon the mounting block 78 as in the embodiment of FIGS. 1–3. In this embodiment, plate 99 is firmly attached to the cam block 80, either by casting integrally therewith or attaching thereto by other suitable means. Plate 99 extends horizontally beneath the surface 31 of rails 16 and is firmly fixed to the web 100 of rail 16, as by welding. Such integral formation of the cam block 80 with the rail eliminates the need for subsequent re-shimming of the support assembly 72', since the distance between the camming surfaces 82 of this integrally formed assembly and the surfaces 31 of the aisle rails will always be fixed even though settling of the floor might occur.

Upon considering the above description of the invention, it will be evident that a simple and inexpensive self adjusting track extension is provided in accordance with the principles of the invention which will automatically, and by a camming action, adjust for differences in elevation between the aisle supporting surfaces of each of the individual respective aisles in which the load carrier is to be operated and this critical alignment between the rails of the respective aisles and the transfer car is easily, inexpensively and reliably achieved. Moreover, the self adjustable track extension of the present invention may be advantageously employed where the storage and retrieval system includes more than one transfer vehicle, since variations between these vehicles is readily compensated for by the present invention. In addition, the need for realignment due to subsequent floor settlement and rail wear is substantially reduced and, if such realignment does become necessary, it may be readily achieved simply by re-shimming either pin 50 or the support assemblies 72 as necessary. Also settlement of the transfer vehicle rails 20 and 20' or the aisle rails 16 and 16' relative to each other will automatically be compensated by the self adjusting track extension of the invention. Although such settlement will displace the planes of the transfer car rail surfaces 32 from the aisle rail surfaces 31, these surfaces and the supporting surface 42 of the track extension will still remain continuous and smooth transfer of the load carrier thereby continues to occur.

It should be understood that although the track extensions of the preferred embodiments of invention have been shown as preferably being mounted for pivotal movement upon the transfer vehicle and upon one side of that vehicle only, that the extensions of the invention may be reversed such that a plurality of members are pivotally mounted adjacent the respective ends of the various aisle rails and the camming surfaces are carried upon the transfer vehicle and the extensions may also extend from both sides of the transfer vehicle. Although mounting of the extensions adjacent the aisle rail ends is possible, the preferred embodiment is that which has been described in which the extensions are pivotally mounted to the transfer car, since such arrangement minimizes the number of extensions which must be provided. In addition, camming surfaces which cam the extensions into continuous relationship in response to movement of the transfer car in its transverse direction are preferred, since the complexity and expense of such arrangement is minimized, although it will be understood that the extensions could be powered outward of the transfer vehicle and into position once the transfer vehicle has been aligned with the aisles by employing suitable hydraulic or other power operated cylinders.

It should be understood that the embodiments of the present invention which have been described are merely illustrative of a few of the applications of the principles of the invention. Numerous modifications may be made by those skilled in the art without departing from the true spirit and scope of the invention.

What is claimed is:

1. A self adjusting member for supporting a first vehicle during transfer of said vehicle to and from a second vehicle, comprising:
   an elongate member having an upward facing supporting surface thereon extending substantially the length of said member,
   pivotal mounting means adjacent one end of said member for pivotally mounting said member about a pivot axis for vertical movement of said elongate member thereabout, and
   cam means on said member spaced from said pivotal mounting means toward the other end of said member, said cam means defining a curved surface, said surface being positioned on said member such that a plane perpendicular to said surface is parallel to said pivot axis, said surface urging said member in said vertical movement about said pivot axis when said surface is moved in a direction parallel to said pivot axis and into contact with an abutting element.

2. The member of claim 1 wherein said cam means is positioned on said member adjacent said other end and said curved surface faces downward.

* * * * *